US012411199B2

(12) United States Patent
Oka et al.

(10) Patent No.: US 12,411,199 B2
(45) Date of Patent: Sep. 9, 2025

(54) DEVICE FOR DETERMINING SOUND SOURCE DIRECTION

(71) Applicants: JFE ADVANTECH CO., LTD., Nishinomiya (JP); JFE STEEL CORPORATION, Tokyo (JP)

(72) Inventors: Tomomichi Oka, Nishinomiya (JP); Masahiro Oda, Nishinomiya (JP); Kazuhiro Nomura, Nishinomiya (JP); So Nagano, Tokyo (JP)

(73) Assignees: JFE ADVANTECH CO., LTD., Nishinomiya (JP); JFE STEEL CORPORATION, Tokyo (JP)

( * ) Notice: Subject to any disclaimer, the term of this patent is extended or adjusted under 35 U.S.C. 154(b) by 218 days.

(21) Appl. No.: 18/033,981

(22) PCT Filed: Sep. 8, 2021

(86) PCT No.: PCT/JP2021/033022
§ 371 (c)(1),
(2) Date: Apr. 26, 2023

(87) PCT Pub. No.: WO2022/091591
PCT Pub. Date: May 5, 2022

(65) Prior Publication Data
US 2023/0393228 A1   Dec. 7, 2023

(30) Foreign Application Priority Data

Oct. 30, 2020 (WO) .................. PCT/JP2020/040905

(51) Int. Cl.
*G01S 3/801* (2006.01)
*H04R 1/08* (2006.01)

(52) U.S. Cl.
CPC ................ *G01S 3/801* (2013.01); *H04R 1/08* (2013.01)

(58) Field of Classification Search
None
See application file for complete search history.

(56) References Cited

U.S. PATENT DOCUMENTS 9,930,448 B1 *   3/2018  Chen .................... H04R 3/005
2016/0080867 A1 *  3/2016  Nugent .................. H04R 1/02
                                                      381/26

(Continued)

FOREIGN PATENT DOCUMENTS

CN   106548783 A   3/2017
CN   107750464 A   3/2018

(Continued)

OTHER PUBLICATIONS

Nov. 30, 2021 International Search Report issued in International Application No. PCT/JP2021/033022.
Huang et al. "Design of Robust Concentric Circular Differential Microphone Arrays", The Journal of the Acoustical Society of America, vol. 141, No. 5, May 16, 2017, pp. 3236-3249.
Aug. 16, 2023 Office Action issued in Japanese Patent Application No. 2021-557264.

(Continued)

*Primary Examiner* — Kenny H Truong
(74) *Attorney, Agent, or Firm* — Oliff PLC

(57) ABSTRACT

A device for determining sound source direction includes an array sensor including a plurality of microphones that measures a sound wave, and a processor for calculating a sound pressure in each direction based on sound pressure information of the sound wave obtained by the array sensor and for determining a direction in which the sound pressure is maximum as a direction of sound wave arrival. The plurality of microphones is provided at vertices of two or more concyclic polygons that are on a same plane and that have a same center and are arranged so as to be non-rotationally symmetric as a whole array sensor.

10 Claims, 12 Drawing Sheets

(56) References Cited

U.S. PATENT DOCUMENTS

| | | | |
|---|---|---|---|
| 2016/0323668 A1 | 11/2016 | Abraham et al. | |
| 2021/0134021 A1* | 5/2021 | Yoshikuni | H04N 23/63 |

FOREIGN PATENT DOCUMENTS

| | | |
|---|---|---|
| JP | H10-70412 A | 3/1998 |
| JP | 2005-521283 A | 7/2005 |
| JP | 2011-15050 A | 1/2011 |
| JP | 2014-137323 A | 7/2014 |
| JP | 2016-39407 A | 3/2016 |
| JP | 2017-530580 A | 10/2017 |
| KR | 20200072061 A | 6/2020 |
| WO | 2018/056214 A1 | 3/2018 |
| WO | 2020/053601 A1 | 3/2020 |

OTHER PUBLICATIONS

Jan. 5, 2024 Extended European Search Report issued in European Patent Application No. 21885710.0.

Lau, S. K., "Optimal Circular Array Configuration." 14th International Congress on Sound and Vibration 2007, ICSV 2007; Jul. 9, 2007 to Jul. 12, 2007; Cairns, QLD, Australia, Australian Acoustical Society, AUS, vol. 4, Jan. 1, 2007 (Jan. 1, 2007), pp. 3510-3517, XP009550341, ISBN: 978-0-7334-2516-5.

Mar. 29, 2024 Office Action issued in Korean Application No. 10-2023-7013921.

Jun. 30, 2025 Office Action issued in Chinese Patent Application No. 202180071562.3.

* cited by examiner

FIG. 6
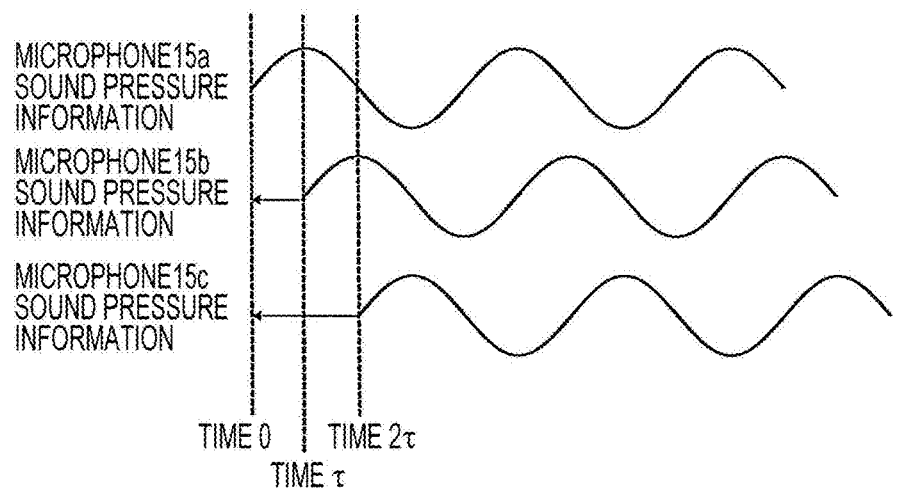
FIG. 7
(a)
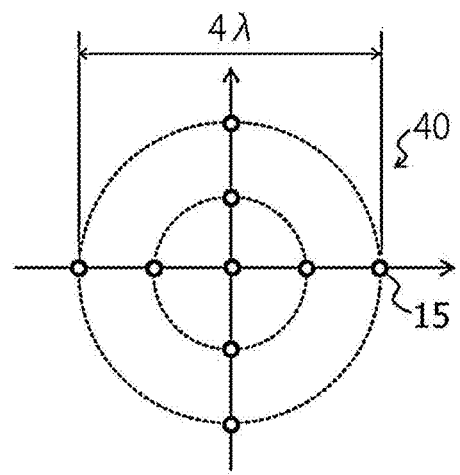
(b)
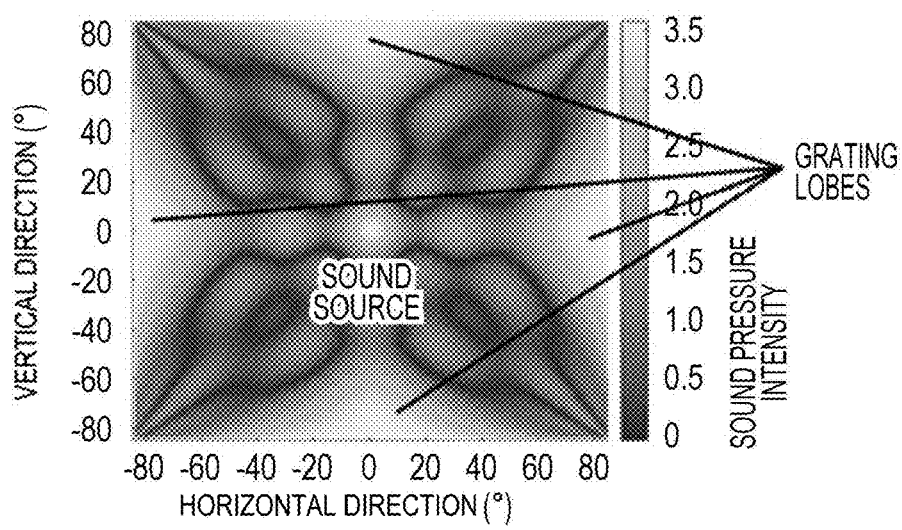

FIG. 8
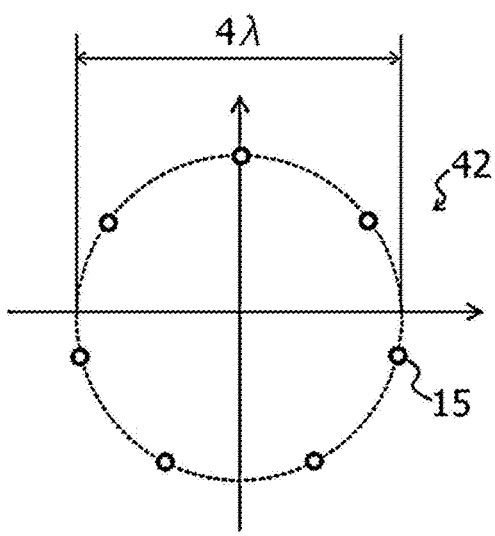
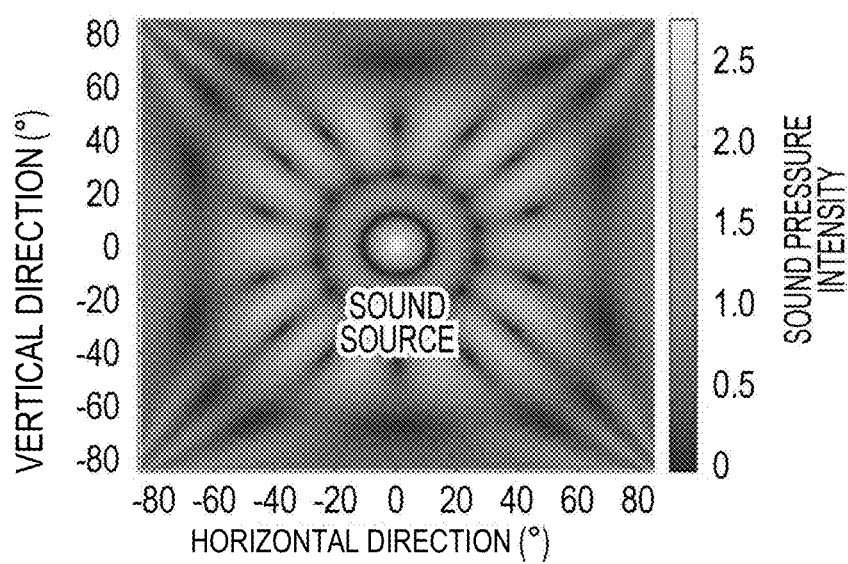

FIG. 9
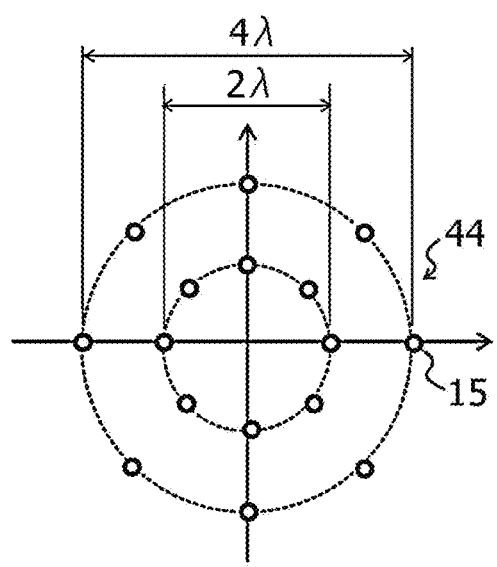
(a)
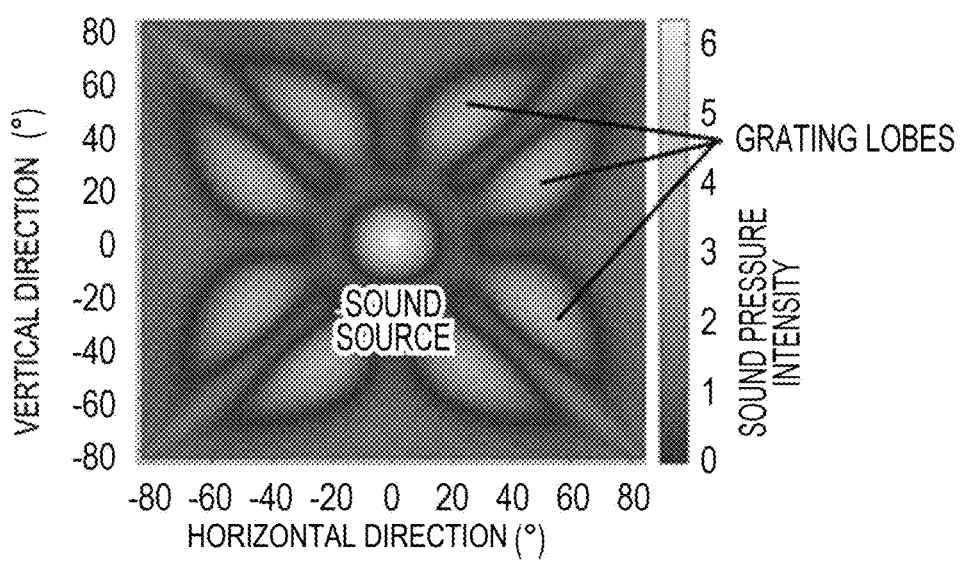
(b)

FIG. 10
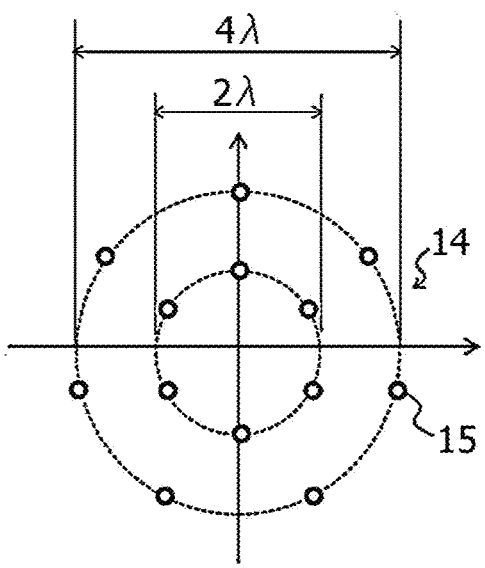
(a)
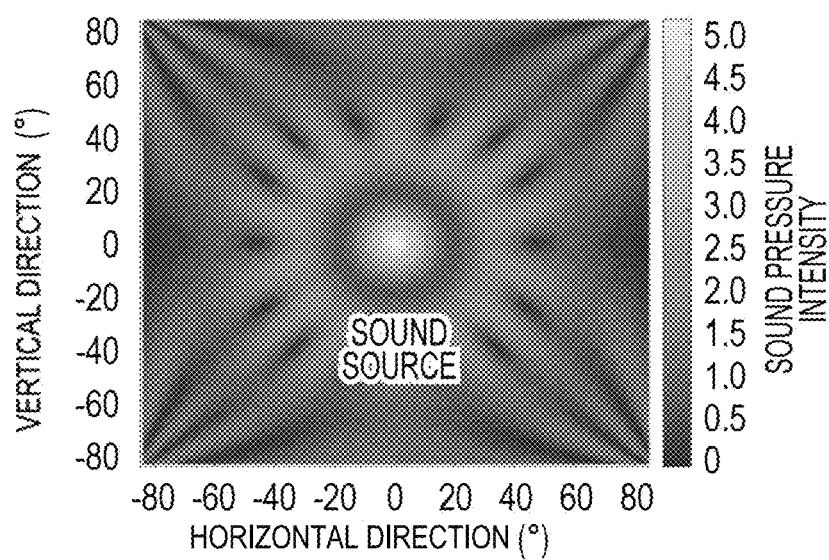
(b)

FIG. 16
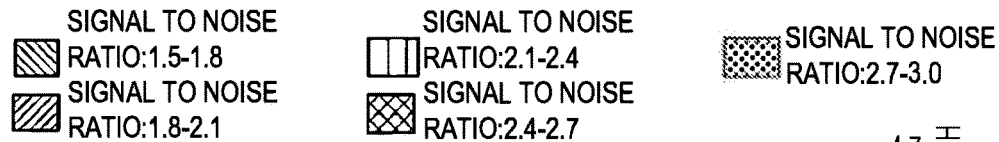
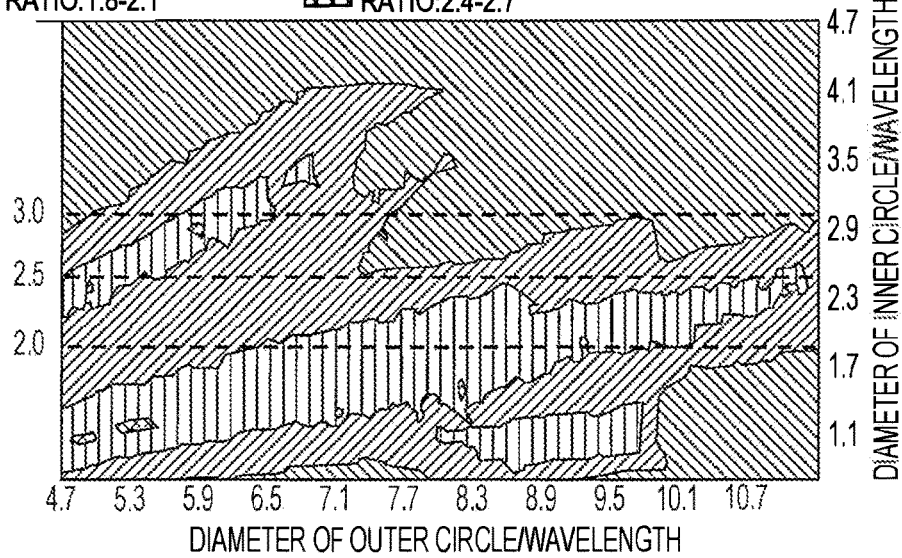
FIG. 17
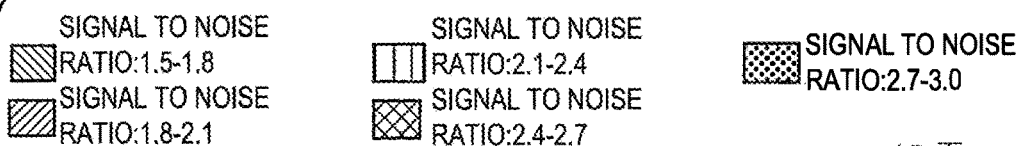
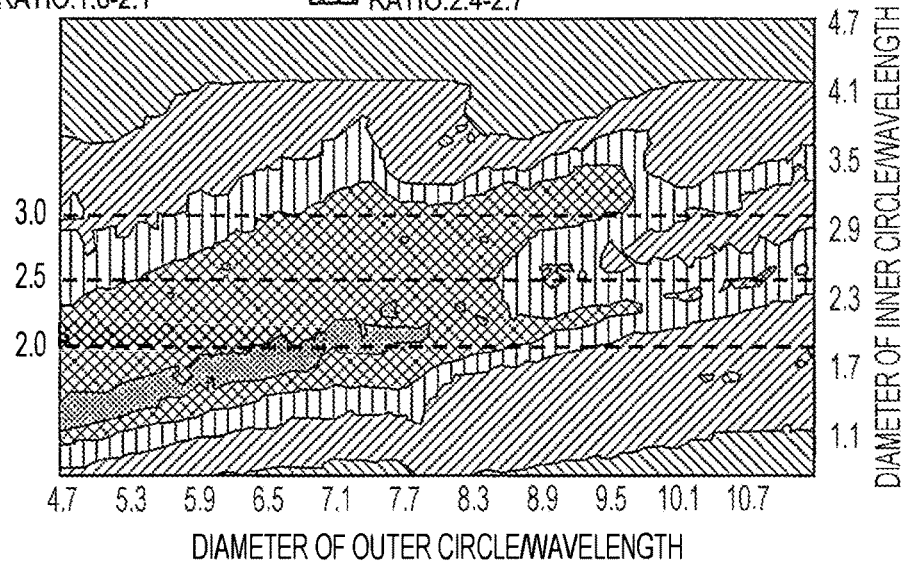

DEVICE FOR DETERMINING SOUND SOURCE DIRECTION

TECHNICAL FIELD

This application relates to a device for determining sound source direction including an array sensor capable of improving directivity while suppressing an increase in the number of microphones, as well as suppressing the occurrence of grating lobes.

BACKGROUND

There has been known, as a device that searches for the position of a sound source, a device for determining sound source direction including an array sensor with a plurality of microphones arranged on a plane. In this device, it is necessary to increase the aperture in order to achieve high directivity. In addition, due to the regularity of the phase difference of the sound pressure observed by the individual microphones, grating lobes (false signals) occur depending on the microphone arrangement, causing misdetermination. In order to prevent these grating lobes from occurring in the real region (positions within 180° from the sound source), it is necessary to set the microphone spacing to $\lambda$ (wavelength)/2 or less.

In contrast, Patent Literature 1 discloses that the occurrence of grating lobes can be suppressed without setting the microphone arrangement spacing to $\lambda/2$ or less, by narrowing the search range of the sound source. As mentioned above, by narrowing the search range, the occurrence of grating lobes can be suppressed without setting the microphone spacing to $\lambda/2$ or less. However, in order to improve directivity, it is necessary to further increase the aperture, and many microphones are required to suppress grating lobes while increasing the aperture.

There has also been devised technology for suppressing the occurrence of grating lobes by arranging microphones so as to avoid spatial regularity, thereby suppressing the regularity of the phase difference of the sound pressure observed by the individual microphones. For example, Patent Literature 2 discloses an array sensor in which spatial regularity is avoided by arranging array elements along the shape of a logarithmic spiral. Patent Literature 3 and 4 disclose technology for suppressing the regularity of the phase difference of the sound pressure observed by the individual microphones by having subarrays, though they have rotational symmetry as spatial regularity, thereby suppressing the occurrence of grating lobes.

CITATION LIST

Patent Literature

PTL 1: International Publication No. 2018/056214
PTL 2: Japanese Unexamined Patent Application Publication No. 10-70412
PTL 3: Japanese Unexamined Patent Application Publication No. 2011-15050
PTL 4: Japanese Unexamined Patent Application Publication (Translation of PCT Application) No. 2005-521283

SUMMARY

Technical Problem

In order to suppress the occurrence of grating lobes, when microphones are arranged as disclosed in Patent Literature 2 to 4, if the number of microphones is reduced while increasing the aperture in order to secure directivity, the microphone arrangement spacing widens, and it becomes difficult to effectively suppress the occurrence of grating lobes within the search range. At the same time, when the microphone spacing is narrowed to prevent grating lobes within the search range, as in the array sensor disclosed in Patent Literature 1, the aperture becomes small and directivity cannot be secured. The disclosed embodiments have been made in view of such background art, and an object thereof is to provide a device for determining sound source direction including an array sensor capable of improving directivity while suppressing an increase in the number of microphones, as well as suppressing the occurrence of grating lobes.

Solution to Problem

The features of the present application for solving such problems are as follows.

(1) A device for determining sound source direction comprising: an array sensor including a plurality of microphones that measures a sound wave; and computing means for calculating a sound pressure in each direction based on sound pressure information of the sound wave obtained by the array sensor, and determining a direction in which the sound pressure is maximum as a direction of sound wave arrival, wherein the plurality of microphones is provided at vertices of two or more concyclic polygons that are on same plane and that have same center, and are arranged so as to be non-rotationally symmetric as a whole array sensor.

(2) The Device for determining sound source direction according to (1), further comprising: a camera that captures an image of a measurement target, wherein the computing means creates a map of sound pressure based on sound pressure information of the sound wave obtained by the array sensor, and creates a superimposed image by superimposing the map of sound pressure on a captured image obtained by the camera.

(3) The device for determining sound source direction according to (2), wherein the camera is provided at center of the concyclic polygons.

(4) The device for determining sound source direction according to any one of (1) to (3), wherein the plurality of microphones is each provided at vertices of two concyclic polygons.

(5) The device for determining sound source direction according to any one of (1) to (4), wherein the concyclic polygons are regular polygons.

(6) The device for determining sound source direction according to any one of (1) to (5), wherein a number of vertices of an outermost concyclic polygon among the two or more concyclic polygons are an odd number.

(7) The device for determining sound source direction according to any one of (1) to (6), wherein a number of the plurality of microphones are 9 or more and 24 or less.

(8) The device for determining sound source direction according to any one of (1) to (7), wherein, a diameter of a circumscribed circle of an innermost concyclic polygon among the two or more concyclic polygons is 3.0×$\lambda$ or less, in which $\lambda$ denotes a wavelength of the sound wave.

(9) device for determining sound source direction according to any one of (1) to (8), wherein, a diameter of a circumscribed circle of an outermost concyclic polygon among the two or more concyclic polygons is 0.5×λ×n or less, in which λ denotes a wavelength of the sound wave, and n denotes a number of the plurality of microphones.

(10) The device for determining sound source direction according to any one of (1) to (9), wherein the computing means shifts time of a plurality of items of the sound pressure information obtained by the plurality of microphones by a set amount based on an assumed sound source direction and arrangement of the microphones, calculates an added value by adding the plurality of items of time-shifted sound pressure information, and, when a plurality of added values is obtained while changing the assumed sound source direction, determines the assumed sound source direction at which a largest added value among the plurality of added values is obtained as a direction of sound wave arrival.

Advantageous Effects

The device for determining sound source direction according to the disclosed embodiments includes an array sensor in which a plurality of microphones is provided at the vertices of two or more concyclic polygons that are on same plane and that have the same center, and are arranged so as to be non-rotationally symmetric as a whole array sensor. Because the array sensor is capable of improving directivity while suppressing an increase in the number of microphones, as well as suppressing the occurrence of grating lobes, the device for determining sound source direction including the array sensor is a device capable of determining the position of a sound source with high accuracy.

BRIEF DESCRIPTION OF DRAWINGS

FIG. 6 is a graph illustrating an example of sound pressure information detected by each microphone.

FIGS. 7A and 7B include diagrams illustrating the result of simulating a map of sound pressure of an array sensor 40.

FIGS. 8A and 8B include diagrams illustrating the result of simulating a map of sound pressure of an array sensor 42.

FIGS. 9A and 9B include diagrams illustrating the result of simulating a map of sound pressure of an array sensor 44.

FIGS. 10A and 10B include diagrams illustrating the result of simulating a map of sound pressure of the array sensor 14.

FIG. 16 is a diagram illustrating the signal to noise ratios of 7-9-gonal array sensors.

FIG. 17 is a diagram illustrating the signal to noise ratios of 9-11-gonal array sensors.

DETAILED DESCRIPTION

Figure 1:
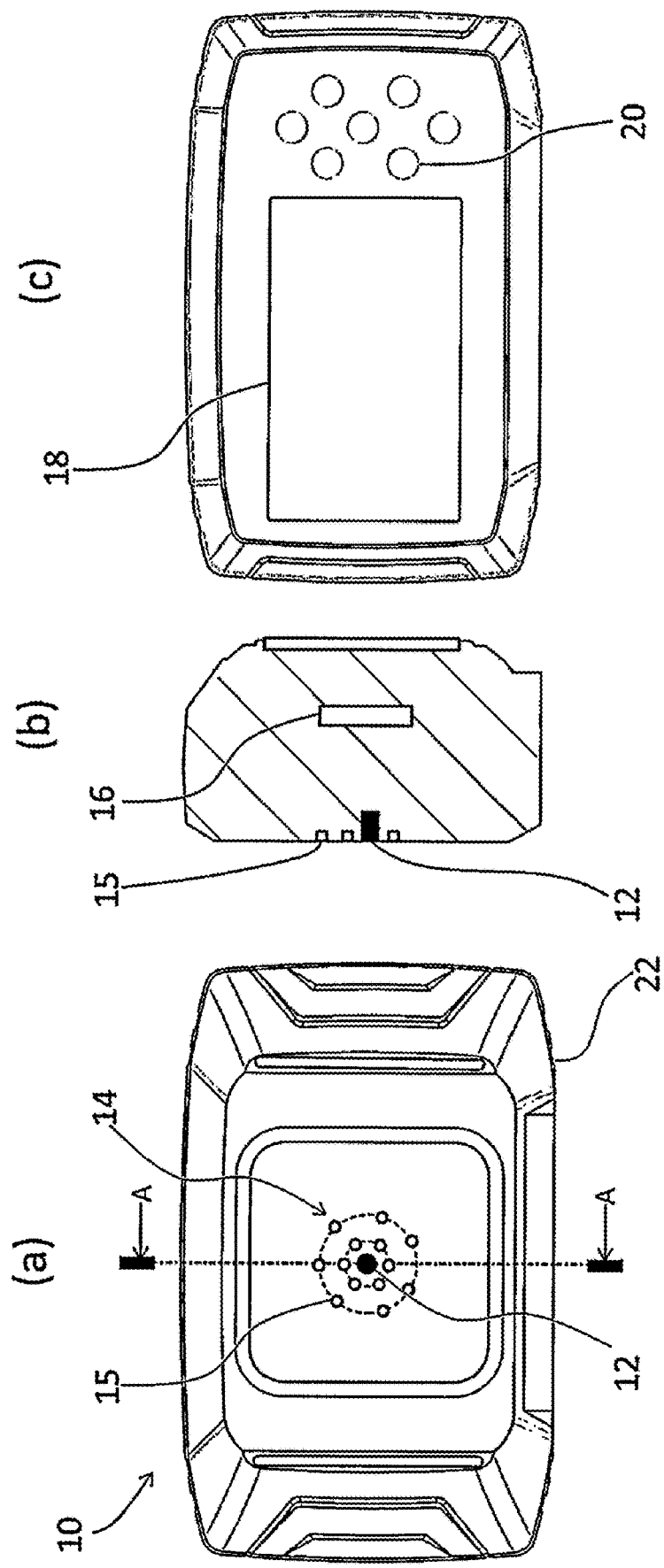
FIGS. 1A, 1B, and 1C include diagrams illustrating the overall configuration of a device for determining sound source direction 10 according to a present embodiment.

Hereinafter, the disclosure will be described through a disclosed embodiment. FIG. 1 includes diagrams illustrating the overall configuration of a device for determining sound source direction 10 according to the present embodiment. FIG. 1(a) is a front view of the device for determining sound source direction 10, FIG. 1(b) is a cross sectional view taken along A-A in FIG. 1(a), and FIG. 1(c) is a back view of the device for determining sound source direction 10.

The device for determining sound source direction 10 according to the present embodiment includes a camera 12, an array sensor 14, computing means 16, display means 18, input means 20, and a housing 22. In the example illustrated in FIG. 1, the camera 12 and the array sensor 14 are provided on the front side of the housing 22, the computing means 16 is provided inside the housing 22, and the display means 18 and the input means 20 are provided on the back side of the housing 22.

The camera 12 captures an image of a measurement target and outputs the obtained captured image to the computing means 16. The captured image is used for the purpose of being superimposed with a two-dimensional map of sound pressure obtained by the beamforming method. Here, the beamforming method refers to a calculation method of using the phase difference of a sound wave measured by a plurality of microphones to obtain the angle of arrival of the sound wave relative to the front direction of the microphones. The magnification, the width of the field of view, and the like of the camera 12 may be appropriately adjusted depending on a desired search range. The camera 12 is, for example, a digital camera equipped with an image sensor such as a CCD sensor or a CMOS sensor and a lens.

The camera 12 is provided at the center of the array sensor 14. By providing the camera 12 at the center of the array sensor 14, when a map of sound pressure obtained by the beamforming method is superimposed on a captured image, the superimposed image of the map of sound pressure and the captured image can be created without mismatch regardless of the distance to the measurement target.

The array sensor 14 includes a plurality of microphones 15. The microphones 15 measure a sound wave emitted from a sound source and output sound pressure information. In the present embodiment, the microphones 15 are provided at the vertices of two concyclic polygons that are on same plane and that have the same center, and the microphones 15 are arranged so as to be non-rotationally symmetric as a whole array sensor. The microphones 15 are sensitive to sound waves within a frequency range of 100 kHz from audible sound, and the obtained sound pressure information is subjected to beamforming calculations by the computing means 16 with respect to a bandpass-filtered arbitrary measurement frequency. Although the case in which the microphones 15 are sensitive to certain broadband sound waves has been illustrated by way of example, the microphones 15 may be sensitive to single wavelength or narrowband sound waves.

Figure 2:
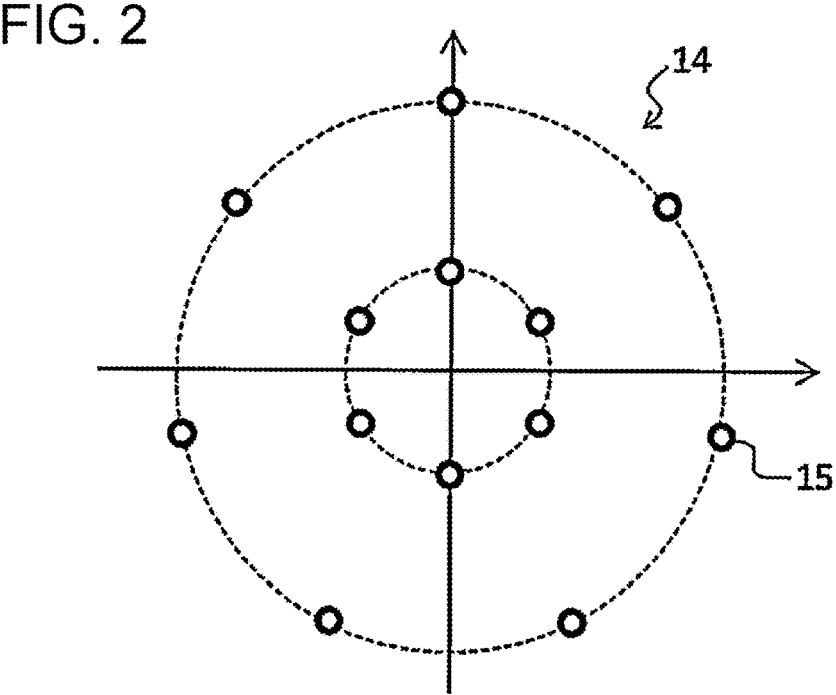
FIG. 2 is a diagram illustrating the arrangement of microphones 15 in an array sensor 14.

FIG. 2 is a diagram illustrating the arrangement of the microphones 15 in the array sensor 14. In the device for determining sound source direction 10 according to the present embodiment, the array sensor 14 includes thirteen microphones 15, for example. In the case where, for example, a 40-kHz sound wave (wavelength is about 8.7 mm) propagating in the atmosphere is the measurement target, the thirteen microphones 15 are provided at the positions of the vertices of an outer concyclic regular heptagon whose circumscribed circle has a diameter of φ 41 mm, and at the positions of the vertices of an inner concyclic regular hexagon whose circumscribed circle has a diameter of φ 15.3 mm. The center of the circumscribed circle of the outer concyclic regular heptagon is the same as the center of the circumscribed circle of the inner concyclic regular hexagon, and the camera 12 is provided at that position. Note that the frequency of the sound wave to be measured and the size of the circumscribed circle of each concyclic regular n-gon are not limited to the above. For example, the measurement frequency may be selected from a frequency range of 100 kHz from audible sound (such as 20 Hz), and the size of the circumscribed circle of each concyclic regular n-gon may be appropriately set according to that frequency (wavelength).

In the device for determining sound source direction 10 according to the present embodiment, the thirteen microphones 15 are provided at the vertices of the outer concyclic regular heptagon and the inner concyclic regular hexagon, which are concyclic polygons having the same center, and the microphones 15 arranged as above are non-rotationally symmetric as a whole array sensor. Here, being non-rotationally symmetric means an arrangement that, while the array sensor 14 is rotated 360° relative to the center of the circumscribed circles of the concyclic polygons, all the microphones 15 are not simultaneously arranged the same as before the rotation. As mentioned above, by arranging the microphones 15 so as to be non-rotationally symmetric as a whole array sensor, the array sensor 14 is enabled to improve directivity while suppressing an increase in the number of microphones, and to suppress the occurrence of grating lobes.

The computing means 16 creates a map of sound pressure indicating the sound pressure intensity of the sound wave according to each separated direction by performing beam-forming calculations on sound pressure information measured by the array sensor 14. The computing means 16 creates a superimposed image by superimposing the map of sound pressure on a captured image obtained by the camera 12. The superimposed image is created by superimposing the map of sound pressure on the captured image. In the superimposed image, the subject and the sound pressure intensity are superimposed and displayed. So, when the user checks the superimposed image, the user can understand correspondence between the position of the subject in the captured image and the sound pressure distribution at a glance. The computing means 16 outputs the created superimposed image to the display means 18, and displays the superimposed image on the display means 18.

The display means 18 may be a liquid crystal display (LCD), for example, which displays a superimposed image created by the computing means 16. The input means 20 may be, for example, push switches which are plurally provided near the display means 18. When the user presses the input means 20, a certain input signal is input to the computing means 16. Instead of or together with the push switches, the touchscreen-type input means 20 may be used.

Figure 3:
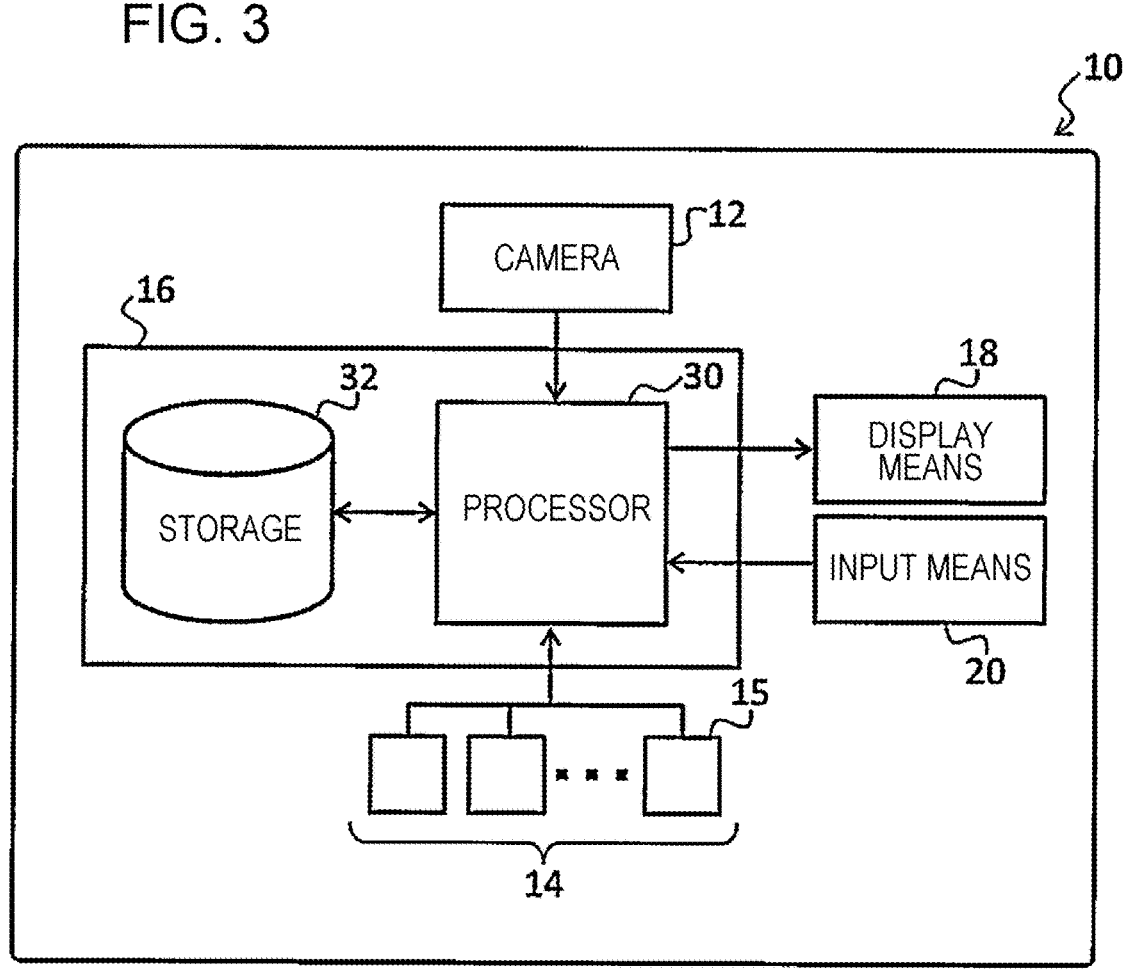
FIG. 3 is a functional block diagram of the device for determining sound source direction 10.

FIG. 3 is a functional block diagram of the device for determining sound source direction 10. Using FIG. 3, the processing of the device for determining sound source direction 10 to display a superimposed image will be described. The computing means 16 includes a processor 30 and a storage 32. The processor 30 is, for example, a CPU or the like, which controls the operation of the device for determining sound source direction 10 using programs and data stored in the storage 32, and executes certain arithmetic operation. The storage 32 includes an information recording medium such as a re-recordable flash memory, a built-in hard disk or a hard disk connected by a data communication terminal, or a memory card, and a read/write device therefor. The storage 32 stores in advance programs for realizing various functions of the device for determining sound source direction 10, and various information used in executing the programs.

The camera 12 captures an image of a measurement target. The camera 12 outputs the captured image to the processor 30. The array sensor 14 measures the sound pressure caused by a sound wave emitted from the direction of the measurement target. The array sensor 14 outputs the measured sound pressure as sound pressure information to the processor 30.

The processor 30 divides a range corresponding to the field of view of the camera 12 into a predetermined number of direction divisions, and performs beamforming calculations on sound pressure information obtained from the array sensor 14 to create a map of sound pressure corresponding to the image capturing area. The processor 30 creates a superimposed image by superimposing the map of sound pressure corresponding to the image capturing area on the captured image. The processor 30, for example, creates a superimposed image by making the map of sound pressure a transparent image and superimposing it on the captured image.

The processor 30 calculates the sound pressure in each direction based on sound pressure information of the sound wave obtained by the array sensor 14, and determines a direction in which the sound pressure is maximum as the direction of sound wave arrival. At this time, the processor 30 determines the direction of sound wave arrival by beamforming calculations using, for example, a so-called delay and sum beamforming that determines the direction of the sound source from the time difference (phase difference) of sound pressure information detected by the individual microphones 15.

Figure 4:
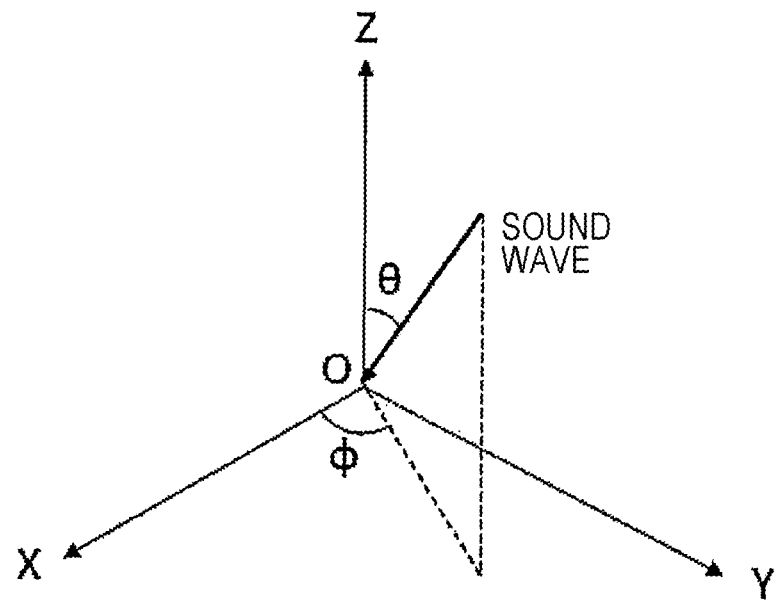
FIG. 4 is a schematic diagram illustrating an example of the direction of arrival of a sound wave.

FIG. 4 is a schematic diagram illustrating an example of the direction of sound wave arrival. As illustrated in FIG. 4, the direction of sound wave arrival is the direction in which the sound source is located, and is expressed as an arrival angle (θ, φ) using an direction angle θ relative to a direction (Z direction) perpendicular to an arrangement plane (XY plane) of the microphones 15 and an direction angle φ relative to an arbitrary direction (such as the Y direction) serving as a reference on the arrangement surface (XY plane). The processor 30 uses sound pressure information detected by the microphones 15 to determine the arrival angle (θ, φ) using the delay and sum beamforming.

Figure 5:
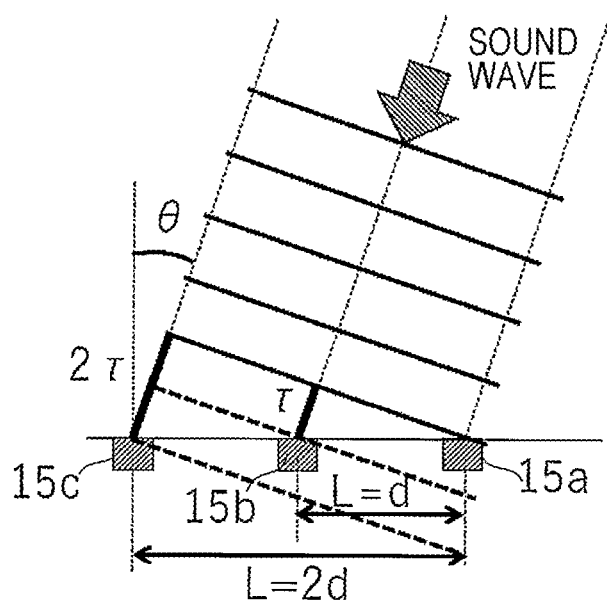
FIG. 5 is a schematic diagram illustrating how sound wave information is detected by a plurality of microphones.

FIG. 5 is a schematic diagram illustrating how sound wave information is detected by the microphones, and FIG. 6 is a graph illustrating an example of sound pressure information detected by each microphone. For ease of explanation, FIGS. 5 and 6 illustrate by way of example for the case in which three microphones 15a to 15c are arranged. In response to the arrival of a sound wave with the arrival angle (θ, φ), when the microphone 15a serves as a reference microphone, the sound wave reaches the microphone 15*b* with a gap of a time difference τ relative to the microphone 15*a*. The time difference τ(s) of the wave reaching the microphone 15*a* and the microphone 15*b* is obtained by equation (1) below using the sound velocity v (mm/s), the direction angle θ, and the distance L between the microphones 15*a* and 15*b* is d (mm).

$$\tau = (L \times \sin\theta)/v \qquad (1)$$

Although it is illustrated in FIGS. 5 and 6 that the time difference τ (phase difference) occurs due to the direction angle θ, the time difference τ due to the direction angle φ also occurs. The concept of the direction angle φ is also the same as equation (1), and the time difference τ changes depending on the arrival angle (θ, φ).

In equation (1), on the assumption that the sound wave arrives from the sound source that is sufficiently far away relative to the microphone spacing, the sound wave at the microphone 15*c* whose distance L from the reference microphone 15*a* is only the spacing 2*d* arrives with a time difference 2τ. Therefore, as illustrated in FIG. 6, sound pressure information detected by each of the microphones 15*a* to 15*c* is shifted by the amount of the time difference τ according to the distance L from the reference microphone 15*a*. Using the above, the processor 30 determines the arrival angle (θ, φ) of the sound wave.

Specifically, the processor 30 shifts the time of sound pressure information obtained by each of the microphones 15 by the amount of the time difference τ, and calculates an added value by adding a plurality of items of time-shifted sound pressure information. In the processor 30, a plurality of different time differences τ corresponding to the arrival angle (θ, φ) is set in advance, and the plurality of different time differences τ is set to the individual microphones 15 according to the distance L. The processor 30 uses the set different time differences τ to change the amount of time to be shifted and obtains a plurality of added values.

An added value obtained by an addition using the time difference τ corresponding to the arrival angle (θ, φ) is the largest because the waveforms of items of sound pressure information are matched in phase. In contrast, among the plurality of added values, an added value obtained by an addition using the time difference τ not corresponding to the arrival angle (θ, φ) is not large because the waveforms are not matched in phase and cancel each other out. Therefore, the processor 30 determines, among a plurality of added values obtained by sequentially changing an assumed arrival angle (θ', φ') assumed within the sound source search range, an assumed arrival angle resulting in the largest added value as the direction of the sound source.

As mentioned above, when the direction is determined by the delay and sum beamforming described above, it is desirable to use the array sensor 14 with characteristics that suppress the occurrence of grating lobes while increasing directivity by narrowing the beam width. In this regard, in the case of the array sensor 14 in which the microphones 15 are arranged as illustrated in FIG. 2, characteristics that the beam width is narrow and that suppress the occurrence of grating lobes can be obtained (see FIG. 10 described later). Therefore, the direction can be determined with high accuracy by the delay and sum beamforming.

Although the delay and sum beamforming with which the processor 30 determines the arrival angle (θ, φ) based on the time difference τ has been illustrated in FIGS. 5 to 7, this is not the only possible method, and various known methods can be applied. For example, sound pressure information simultaneously observed by the microphones 15*a* to 15*c* is regarded as a two-dimensional spatial sound pressure field, and a two-dimensional Fourier transform is spatially performed to obtain a spatial frequency; and, by utilizing the correlation between the spatial frequency and the arrival angle (θ, φ), a sound source direction determination result that is almost equivalent to that of beamforming calculations using the delay and sum beamforming can also be obtained.

The processor 30 displays a created superimposed image on the display means 18. As a map of sound pressure used for a superimposed image to be displayed on the display means 18, a color image having successively different colors depending on the sound pressure intensity may be used. In response to an entry of instructions from the input means 20 to save the image displayed on the display means 18, the processor 30 stores the camera image and the superimposed image in the storage 32.

The device for determining sound source direction 10 according to the present embodiment creates a superimposed image as above and displays it on the display means 18. In the device for determining sound source direction 10 as above, it is preferable to use an array sensor with high sound source direction determination performance from the viewpoint of enhancing the sound source direction determination accuracy. The sound source direction determination performance of the array sensor is greatly affected by the arrangement of the microphones 15.

There are two indices for the sound source determination performance: directivity and signal to noise ratio. Directivity is an index indicating whether the sound pressure (hereinafter referred to as the "main lobe") of the sound source observed on the map of sound pressure can be displayed sharply, and the higher the directivity, the narrower the full width at half maximum (FWHM) of the main lobe, which is thus advantageous for determining the direction of the sound source. In order to increase directivity, it is effective to increase the aperture of the array sensor. The aperture is the diameter of a circle passing through the multiple microphones 15 arranged on the outer side, and, in the present embodiment, the aperture is the diameter of an outer concyclic polygon.

The signal to noise ratio is the intensity ratio of the main lobe to the intensity of a grating lobe (false signal) and is calculated as (intensity of main lobe)/(intensity of grating lobe). A high signal to noise ratio means that the intensity of the grating lobe is sufficiently low compared to the intensity of the main lobe. If the intensity of the grating lobe can be reduced relative to the intensity of the main lobe, a misjudgment of the direction of the sound source due to the grating lobe can be suppressed. Accordingly, a high signal to noise ratio is advantageous for the determination of the direction of the sound source. In order to increase the signal to noise ratio, it is effective to increase the number of microphones 15 and narrow the arrangement spacing of the microphones 15, but it is preferable that the number of microphones 15 be as small as possible from the viewpoint of reducing the product cost and the computational load.

Therefore, in order to consider an array sensor with high determining performance of sound source direction that can suppress the occurrence of grating lobes while suppressing an increase in the number of microphones 15, the maps of sound pressure of various array sensors with different arrangements of the microphones 15 have been examined by simulation. In this simulation, the scale is generalized with a constant aperture relative to the measured wavelength; if the measured wavelength changes, the actual dimensions of aperture changes depending on the change in the wavelength. Since directivity is determined by the size of the aperture relative to the wavelength of the measured sound wave, in this simulation, the size of the aperture relative to the wavelength of the measured sound wave is set to be constant (4λ: λ is the wavelength of the sound wave), and each array sensor is evaluated in terms of the signal to noise ratio of the map of sound pressure and the position at which a highly intense grating lobe occurs. The simulation has been conducted using a sound velocity (about 348 m/s) in the air at a temperature of 25° C. and a pressure of 1 atmosphere, assuming that the sound source is located 5 m in front of the device for determining sound source direction 10, and using a search range of ±85° in the vertical direction and ±85° in the horizontal direction relative to a sound wave (frequency 40 kHz) emitted from the sound source.

FIG. 7 includes diagrams illustrating the result of simulating a map of sound pressure of an array sensor 40. FIG. 7(*a*) is a diagram illustrating the arrangement of the microphones 15 in the array sensor 40. FIG. 7(*b*) is a diagram illustrating a map of sound pressure created based on sound pressure information obtained by the array sensor 40 illustrated in FIG. 7(*a*).

In the map of sound pressure (FIG. 7(*b*)) of the array sensor 40 in which nine microphones 15 are equally spaced at a spacing λ in a cross as illustrated in FIG. 7(*a*), since the arrangement has high regularity in which the microphone spacing is λ/2 or more, grating lobes of the same intensity as the main lobe at the center are confirmed at the upper, lower, left, and right ends. The intensity of the main lobe and the intensity of the grating lobes are the same, and the signal to noise ratio is 1.0, which is low. From this result, the array sensor 40 with the microphones 15 arranged in a cross is incapable of suppressing the occurrence of grating lobes. In the present embodiment, the intensity of the main lobe and the intensity of the grating lobes that are used for calculating the signal to noise ratio are both the maximum values within the search range.

FIG. 8 includes diagrams illustrating the result of simulating a map of sound pressure of an array sensor 42. FIG. 8(*a*) is a diagram illustrating the arrangement of the microphones 15 in the array sensor 42. FIG. 8(*b*) is a diagram illustrating a map of sound pressure created based on sound pressure information obtained by the array sensor 42 illustrated in FIG. 8(*a*). The parameters of the simulation used to create FIG. 8(*b*) are entirely the same as those of FIG. 7 except for the arrangement of the microphones 15.

In the map of sound pressure (FIG. 8(*b*)) of the array sensor 42 in which seven microphones 15 are arranged at the vertices of a concyclic regular heptagon as illustrated in FIG. 8(*a*), the signal to noise ratio is 1.4, which is higher than the signal to noise ratio of the array sensor 40 illustrated in FIG. 7. As mentioned above, the arrangement using the vertices of a single concyclic regular polygon is confirmed to be effective for improving the signal to noise ratio. However, due to the wide arrangement spacing of the microphones 15, the intensity of grating lobes remains to be high, and the grating lobes occur around the main lobe at the center. As mentioned above, when the main lobe and the grating lobes are in close proximity, both the main lobe and the grating lobes appear in the field of view, which causes a misjudgment of the position of the sound source and thus is undesirable. From this result, because the array sensor 42 is incapable of sufficiently suppressing the occurrence of grating lobes and grating lobes occur at positions close to the main lobe, it has been confirmed that the array sensor 42 is not desirable for determining the direction of the sound source.

FIG. 9 includes diagrams illustrating the result of simulating a map of sound pressure of an array sensor 44. FIG. 9(*a*) is a diagram illustrating the arrangement of the microphones 15 in the array sensor 44. FIG. 9(*b*) is a diagram illustrating a map of sound pressure created based on sound pressure information obtained by the array sensor 44 illustrated in FIG. 9(*a*). The parameters of the simulation used to create FIG. 9(*b*) are also entirely the same as those of FIG. 7 except for the arrangement of the microphones 15. In the case where the microphones 15 are arranged at the vertices of the single concyclic regular polygon illustrated in FIG. 8(*a*), because the arrangement spacing of the microphones 15 is wide, grating lobes cannot be sufficiently suppressed. A map of sound pressure of the array sensor 44 in which, in order to narrow the arrangement spacing of the microphones 15, as illustrated in FIG. 9(*a*), sixteen microphones 15 are arranged at the vertices of two concyclic regular octagons having the same center, has been confirmed.

In the map of sound pressure (FIG. 9(*b*)) of the array sensor 44 illustrated in FIG. 9(*a*), the signal to noise ratio is 1.7. However, grating lobes with relatively high intensity that are of equivalent size as the main lobe occur over a wide area around the main lobe at the center. Since the microphones 15 constituting the array sensor 44 are rotationally symmetric, there is regularity in the phase difference of the sound pressure obtained by the individual microphones 15, and it is considered that this regularity causes grating lobes. As described above, if grating lobes with relatively high intensity that are of equivalent size as the main lobe occur over a wide area around the main lobe, this causes a misjudgment of the direction of the sound source and thus is undesirable. From this result, it has been confirmed that the array sensor 44 is undesirable for determining the direction of the sound source.

FIG. 10 includes diagrams illustrating the result of simulating a map of sound pressure of the array sensor 14. FIG. 10(*a*) is a diagram illustrating the arrangement of the microphones 15 in the array sensor 14. FIG. 10(*b*) is a diagram illustrating a map of sound pressure created based on sound pressure information obtained by the array sensor 14 illustrated in FIG. 10(*a*). The parameters of the simulation used to create FIG. 10(*b*) are also entirely the same as those of FIG. 7 except for the arrangement of the microphones 15.

In the map of sound pressure (FIG. 10(*b*)) of the array sensor 14 in which thirteen microphones 15 are arranged at the vertices of an outer concyclic regular heptagon and the vertices of an inner concyclic regular hexagon that have the same center as illustrated in FIG. 10(*a*), the signal to noise ratio is 2.2, and no grating lobes with relatively high intensity that are of equivalent size as the main lobe occur over a wide area around the main lobe. Since the microphones 15 in the array sensor 14 illustrated in FIG. 10(*a*) are arranged so as to be non-rotationally symmetric as a whole array sensor, the regularity of the phase difference of the sound pressure obtained by the microphones is avoided, and it is accordingly considered that the occurrence of grating lobes with relatively high intensity that are of equivalent size as the main lobe is suppressed.

From these results, it has been confirmed that the array sensor 14 is an array sensor capable of suppressing the occurrence of grating lobes while suppressing an increase in the number of microphones 15. Therefore, the array sensor 14 in which the microphones 15 are arranged at the vertices of two concyclic polygons that are on same plane and that have the same center so as to be non-rotationally symmetric as a whole array sensor is an array sensor capable of improving directivity while suppressing an increase in the number of microphones 15, as well as suppressing the occurrence of grating lobes. Since the device for determining sound source direction 10 according to the present embodiment includes the array sensor 14 as above, the device for determining sound source direction 10 is a device capable of determining the direction of the sound source with high accuracy.

Figure 11:
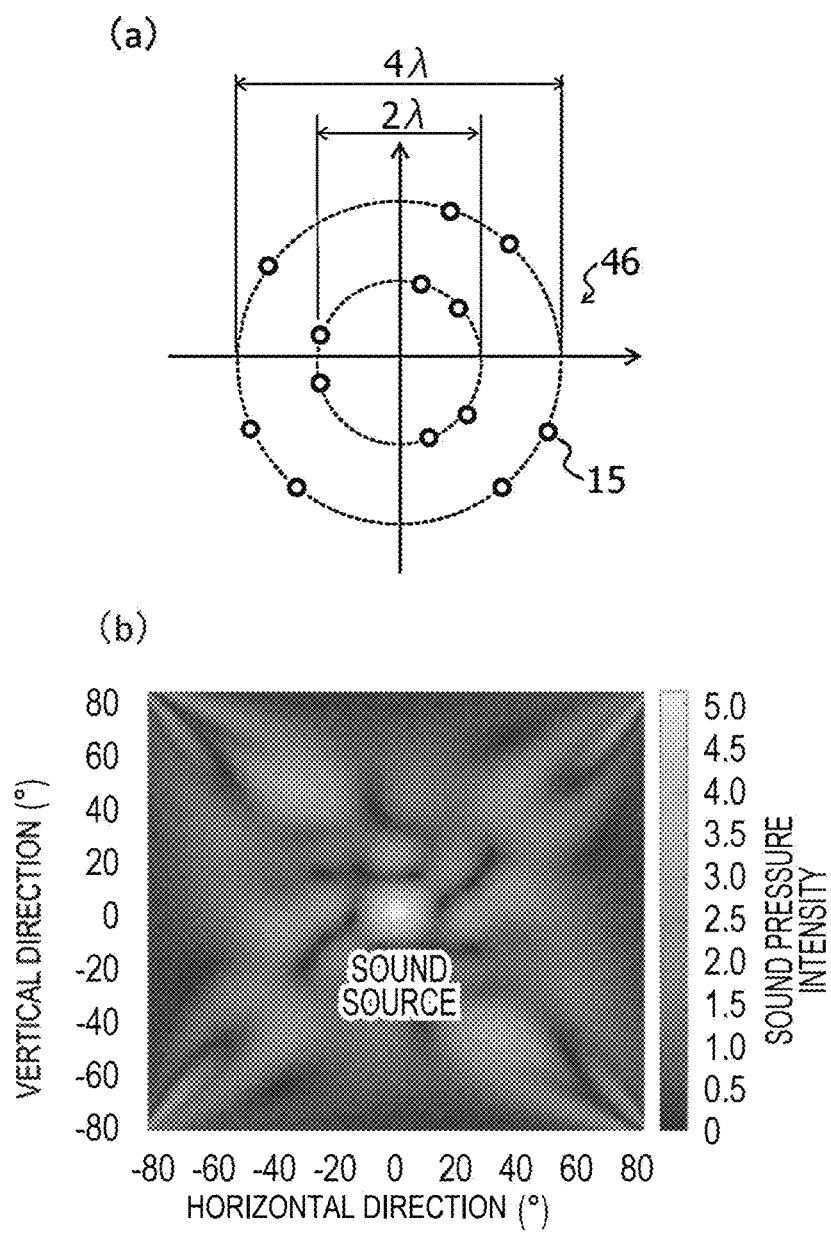
FIGS. 11A and 11B include diagrams illustrating the result of simulating a map of sound pressure of an array sensor 46.

Although the example in which the microphones 15 are arranged at the vertices of concyclic regular polygons on both the outer and inner sides has been illustrated in the example of the array sensor 14 illustrated in FIG. 10, both the inner and outer sides are not limited to concyclic regular polygons. FIG. 11 includes diagrams illustrating the result of simulating a map of sound pressure of an array sensor 46. FIG. 11(a) is a diagram illustrating the arrangement of the microphones 15 in the array sensor 46. FIG. 11(b) is a diagram illustrating a map of sound pressure created based on sound pressure information obtained by the array sensor 46 illustrated in FIG. 11(a). The parameters of the simulation used to create FIG. 11(b) are also entirely the same as those of FIG. 7 except for the arrangement of the microphones 15.

The array sensor 46 illustrated in FIG. 11(a) is such that the positions of the microphones 15 in the array sensor 14 illustrated in FIG. 10 are moved 15° or −15° along the circumscribed circle of the outer concyclic regular heptagon or the circumscribed circle of the inner concyclic hexagon, thus arranging two microphones 15 in close proximity. Even with the array sensor 46 in which the arrangement positions of the microphones 15 are moved as above, the signal to noise ratio is 1.7, and no grating lobes with relatively high intensity that are of equivalent size as the main lobe occur over a wide area around the main lobe.

From this result, it has been confirmed that the inner concyclic polygon and the outer concyclic polygon are not limited to regular polygons, and the arrangement positions of the microphones 15 may be moved as long as they are within a range of ±15° in the circumferential direction of the circumscribed circle from the vertices of each concyclic regular polygon. However, since the occurrence of grating lobes is suppressed and the signal to noise ratio is increased due to the fact that the inner and outer concyclic polygons are regular polygons, it is preferable that the inner and outer concyclic polygons be concyclic regular polygons. Although the example in which the microphones 15 are arranged at the vertices of two concyclic regular polygons has been illustrated in the example of the array sensor 14 illustrated in FIG. 10, the number of concyclic polygons is not limited to two, and may be two or more.

Although the device for determining sound source direction 10 including the camera 12 and the display means 18 has been illustrated in the example illustrated in FIG. 1, this is not the only possible case. For example, the device for determining sound source direction 10 need not include the display means 18 when transmitting a superimposed image to other display means using wireless communication. Furthermore, for example, if the device for determining sound source direction 10 is a device that merely determines the direction of sound wave arrival, the device for determining sound source direction 10 need not include the camera 12 or the display means 18. In this case, the computing means 16 performs beamforming calculations on sound pressure information measured by the array sensor 14, calculates the sound pressure in each direction of a search range arbitrarily set as needed, and determines the direction in which the sound pressure is maximum as the direction of sound wave arrival.

Next, on the assumption that the microphones 15 are arranged on the vertices of two or more concyclic polygons that are on same plane and that have the same center so as to be non-rotationally symmetric as a whole array sensor, the result of confirming a preferred microphone arrangement will be further described. In this confirmation, simulation has been conducted to create a map of sound pressure in the case where the observation field of view is 50° in the horizontal direction and 30° in the vertical direction, and sound sources are installed at the four corners of the observation field of view; and the arrangement of the microphones 15 has been evaluated in terms of a signal to noise ratio calculated from the map of sound pressure. In the following description, the circumscribed circle of the inner concyclic regular polygon will be described as an "inner circle", and the circumscribed circle of the outer concyclic regular polygon will be described as an "outer circle".

Figure 12:
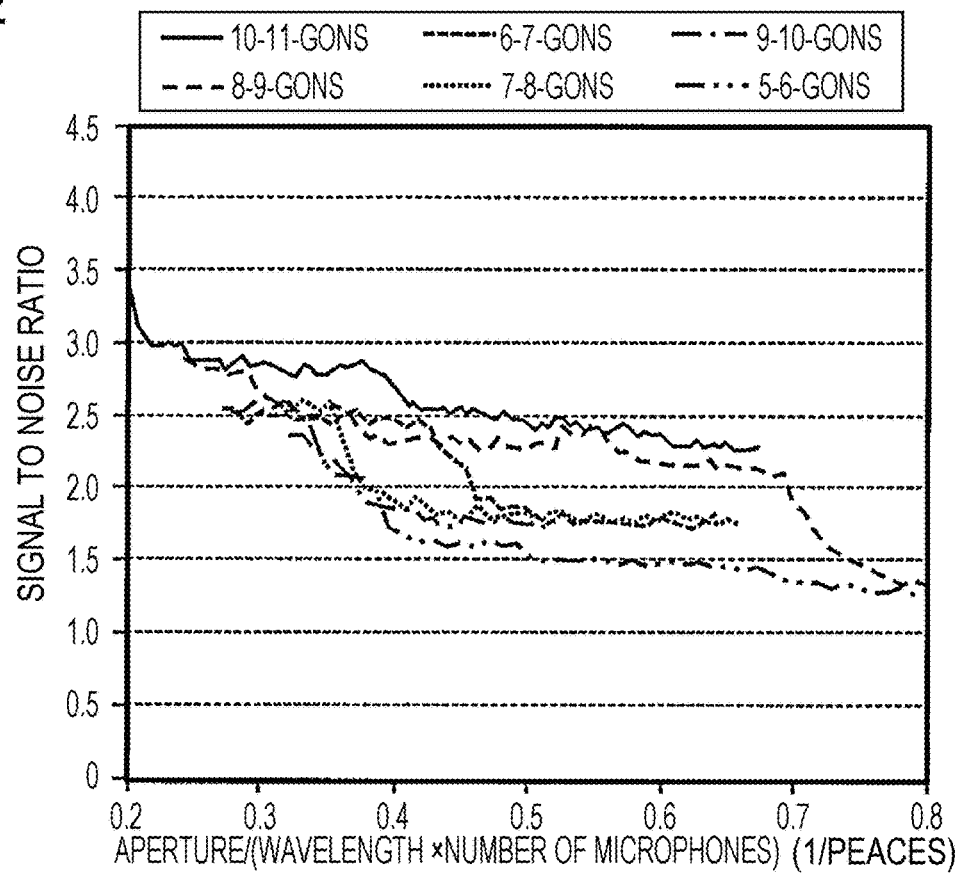
FIG. 12 is a first graph illustrating the signal to noise ratios of various array sensors.

FIG. 12 is a first graph illustrating the signal to noise ratios of various array sensors. In FIG. 12, the horizontal axis is the aperture/(wavelength×number of microphones) (1/pieces), and the vertical axis is the signal to noise ratio. Grating lobes are more likely to occur as the aperture increases, while they are less likely to occur when the wavelength of the sound wave becomes longer or the number of microphones 15 increases. Therefore, the signal to noise ratios of the individual array sensors are compared using a value obtained by dividing the aperture (diameter of the outer circle) by the wavelength and the number of microphones on the horizontal axis. In n-m-gons in FIG. 12, the number n on the left indicates the number of vertices of an inner concyclic regular polygon, and the number m on the right indicates the number of vertices of an outer concyclic regular polygon. That is, 10-11-gons mean an array sensor in which the microphones 15 are arranged at the vertices of an outer concyclic regular decagon and an outer concyclic regular hendecagon. The diameter of the inner circle is set to 7 mm or more, where the signal to noise ratio is greatest. The method of determining the diameter of the inner circle is the same for FIGS. 12 to 15, and the method of displaying each array sensor is the same for FIGS. 12 to 17.

As illustrated in FIG. 12, the signal to noise ratio of an array sensor in which the number of vertices of the outer concyclic regular polygon is an odd number is higher than the signal to noise ratio of an array sensor in which the number of vertices of the outer concyclic regular polygon is an even number. Since the parameters of simulation are the same for each array sensor, a high signal to noise ratio indicates that the occurrence of grating lobes is suppressed. From the results illustrated in FIG. 12, as the array sensor used in the device for determining sound source direction 10, it is preferable to use an array sensor in which the number of vertices of the outer concyclic regular polygon is an odd number, and it has accordingly been confirmed that the occurrence of grating lobes is suppressed. In the case of an array sensor in which the microphones 15 are provided at the vertices of three or more concyclic polygons, it is only necessary that the number of vertices of the outermost concyclic polygon be an odd number.

Figure 13:
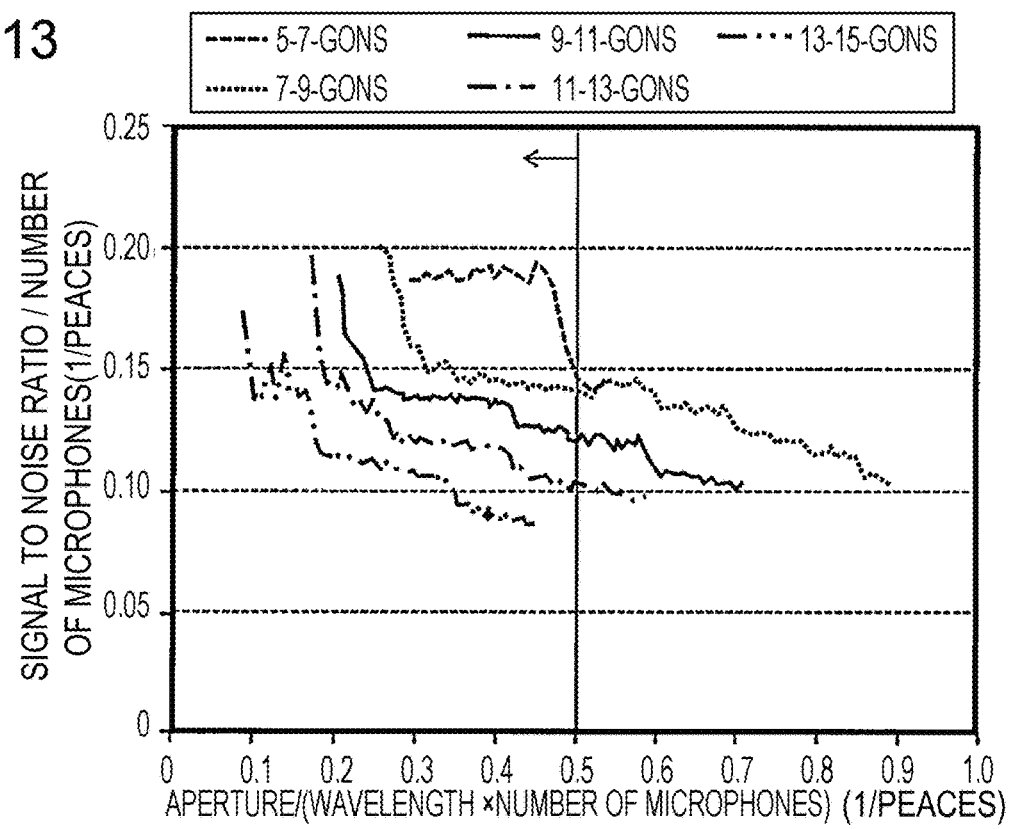
FIG. 13 is a second graph illustrating the signal to noise ratios of various array sensors.

FIG. 13 is a second graph illustrating the signal to noise ratios of various array sensors. The horizontal axis in FIG. 13 is the aperture/(wavelength×number of microphones) (1/peaces), and the vertical axis is the signal to noise ratio/number of microphones (1/peaces). As illustrated in FIG. 13, the ratio of the signal to noise ratio/number of microphones decreases as the number of microphones 15 in each array sensor increases. In particular, when the number of microphones 15 increases from 24 (11-13-gons) to 28

(13-15-gons), the ratio of the signal to noise ratio/number of microphones decreases significantly. This indicates that, even if the number of microphones is increased beyond 24, the effect of increasing the signal to noise ratio by increasing the number of microphones is small, and from this, it can be seen that the number of microphones in the array sensor is preferably 24 or less.

As illustrated in FIG. 13, as the aperture of the outer concyclic regular polygon widens, the value of the signal to noise ratio/number of microphones decreases. Moreover, when the aperture of the outer concyclic regular polygon is widened, the range of appearance of grating lobes gradually expands; and it is thus preferable that the aperture of the outer concyclic regular polygon be 0.5×λ×n or less (λ: wavelength of the sound wave, and n: number of all the microphones). At the same time, as described above, it is effective to increase the aperture in order to enhance directivity. For this reason, it can be said that the aperture of the concyclic regular polygon is more preferably 0.5×λ×n.

In contrast, when the number of microphones 15 in the array sensor decreases, the microphone arrangement spacing widens and grating lobes are more likely to occur, resulting in a concern that the signal to noise ratio decreases. Therefore, a signal to noise ratio of 1.7 or more in the case of aperture/wavelength=3.8 (directional FWHM: 15°) is used as a determination criterion for securing a certain signal to noise ratio while securing an aperture of a certain size. In this way, the minimum number of microphones 15 satisfying the determination criterion has been confirmed.

Figure 14:
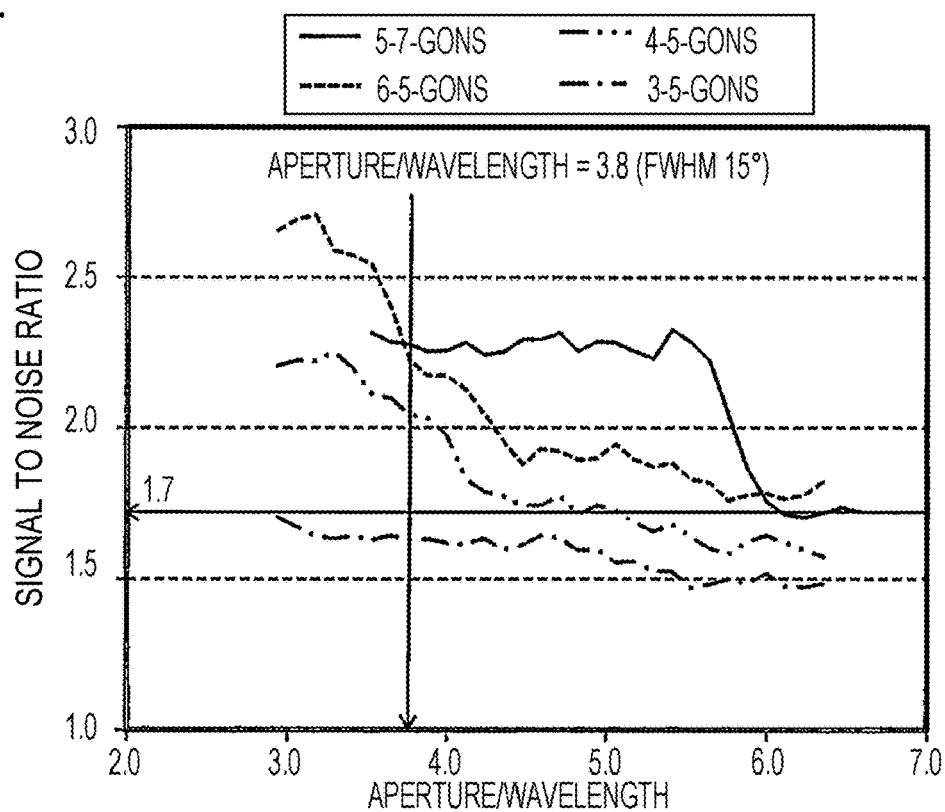
FIG. 14 is a third graph illustrating the signal to noise ratios of various array sensors.

FIG. 14 is a third graph illustrating the signal to noise ratios of various array sensors. The horizontal axis in FIG. 14 is the aperture/wavelength, and the vertical axis is the signal to noise ratio. As illustrated in FIG. 14, an array sensor with 4-5-gons satisfies the above determination criterion, but an array sensor with 3-5-gons does not satisfy the above determination criterion. From this result, it has been confirmed that the number of microphones 15 included in the array sensor is preferably 9 or more.

Figure 15:
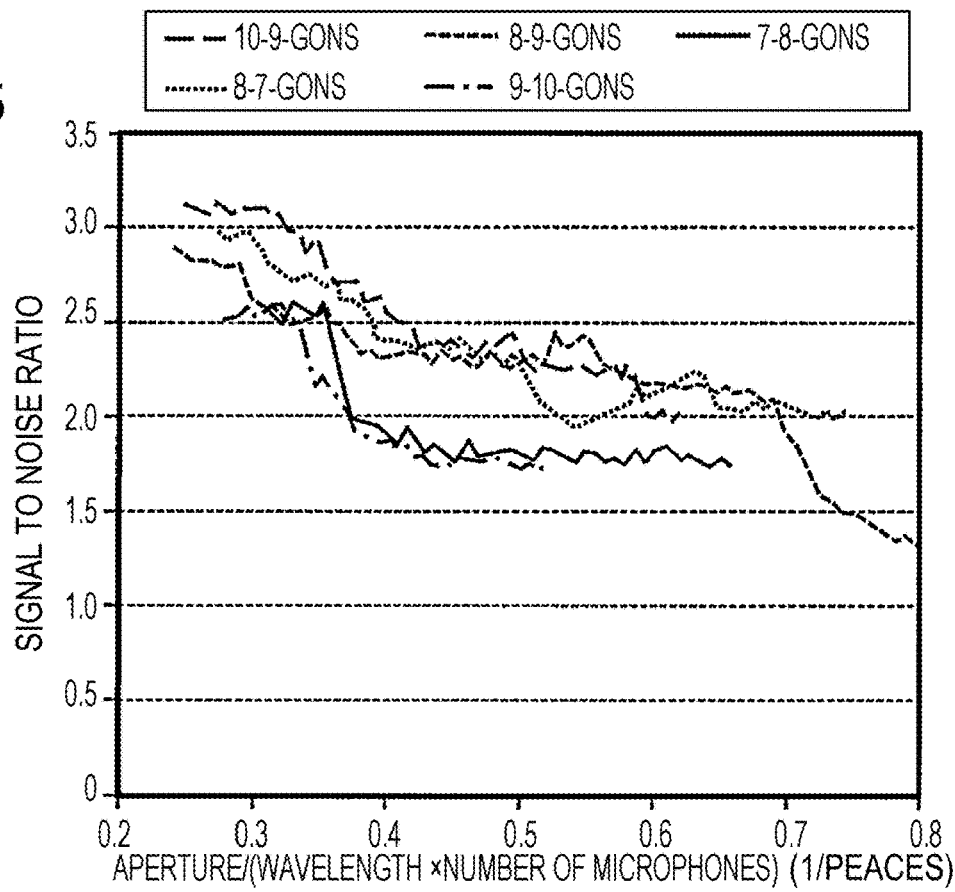
FIG. 15 is a fourth graph illustrating the signal to noise ratios of various array sensors.

FIG. 15 is a fourth graph illustrating the signal to noise ratios of various array sensors. The horizontal axis in FIG. 15 is the aperture/(wavelength×number of microphones) (1/pieces), and the vertical axis is the signal to noise ratio. As illustrated in FIG. 15, the signal to noise ratio of an array sensor with 8-7-gons and the signal to noise ratio of an array sensor with 8-9-gons are almost equivalent. The signal to noise ratio in the case of 9-10-gons is lower than the signal to noise ratio in the case of 10-9-gons, but the decrease amount is almost equivalent to the decrease amount due to the fact that the outer side is a regular polygon with an odd number of vertices as confirmed in FIG. 12. Similarly, the signal to noise ratio in the case of 7-8-gons is lower than the signal to noise ratio in the case of 8-7-gons, but the decrease amount is almost equivalent to the decrease amount due to the fact that the outer side is a regular polygon with an odd number of vertices as confirmed in FIG. 12. From these results, it has been confirmed that the number of vertices of the outer concyclic regular polygon need not be greater than the number of vertices of the inner circle, and that the number of vertices of the inner concyclic polygon may be greater than the number of vertices of the outer concyclic polygon.

FIG. 16 is a diagram illustrating the signal to noise ratios of 7-9-gonal array sensors in which the diameter of the circumscribed circle (hereinafter may be described as the "outer circle") of an outer concyclic regular nonagon and the diameter of the circumscribed circle (hereinafter may be described as the "inner circle") of an inner concyclic regular heptagon are changed. The horizontal axis in FIG. 16 is the diameter of the outer circle/wavelength, and the vertical axis is the diameter of the inner circle/wavelength. The parameters of simulation conducted for obtaining FIGS. 16 to 18 are the same as those of FIG. 12.

FIG. 17 is a diagram illustrating the signal to noise ratios of 9-11-gonal array sensors in which the diameter of the outer circle and the diameter of the inner circle are changed. Furthermore, FIG. 18 is a diagram illustrating the signal to noise ratios of 6-7-gonal array sensors in which the diameter of the outer circle and the diameter of the inner circle are changed. In FIGS. 17 and 18, the horizontal axis is the diameter of the outer circle/wavelength, and the vertical axis is the diameter of the inner circle/wavelength.

Figure 18:
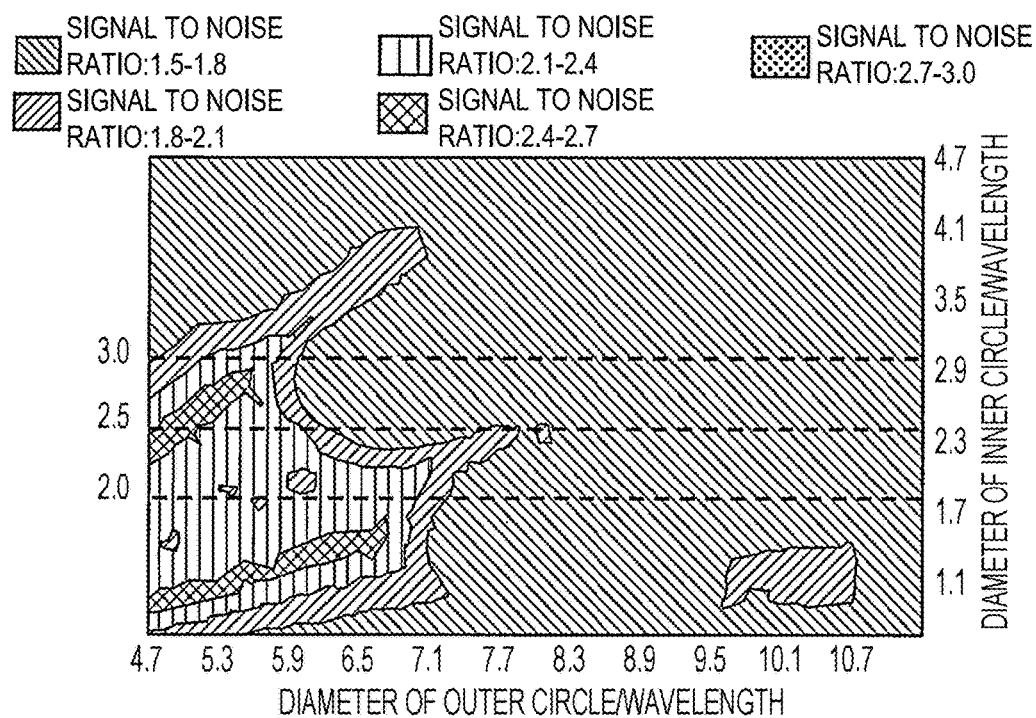
FIG. 18 is a diagram illustrating the signal to noise ratios of 6-7-gonal array sensors.

As illustrated in FIGS. 16 to 18, it can be seen that the signal to noise ratio is enhanced by setting the diameter of the inner circle/wavelength to 3.0 or less, that is, by setting the diameter of the inner circle to 3×λ or less (λ: wavelength of the sound wave). It can be seen that, by setting the diameter of the inner circle/wavelength to 2.5 or less, the signal to noise ratio is enhanced more, and, by setting the diameter of the inner circle/wavelength to 2.0, signal to noise ratio is enhanced further. From these results, it can be seen that the diameter of the inner circle/wavelength is preferably 3.0 or less, more preferably 2.5 or less, and further preferably 2.0. At the same time, when the diameter of the inner circle is less than 7 mm, it may be difficult to arrange the microphones 15 and the camera 12; and it is thus preferable that the diameter of the inner circle be 7 mm or more. In the case of an array sensor in which the microphones 15 are provided at the vertices of three or more concyclic polygons, the diameter of the circumscribed circle of the innermost concyclic polygon may be 3.0×λ or less.

To summarize the above results, in an array sensor in which the microphones 15 are provided at the vertices of two concyclic polygons that are on same plane and that have the same center and are arranged so as to be non-rotationally symmetric as a whole array sensor, it is preferable to arrange the microphones 15 as described in 1 to 5 below, and it has accordingly been confirmed that the occurrence of grating lobes can be suppressed.

1. The number of vertices of the outer concyclic polygon is an odd number.
2. The number of microphones 15 in the array sensor is 24 or less.
3. The number of microphones 15 in the array sensor is 9 or more.
4. The aperture of the array sensor is 0.5×λ×n or less (λ: wavelength of the sound wave, and n: number of microphones).
5. The diameter of the inner circle is 3.0×λ or less (λ: wavelength of the sound wave)

REFERENCE SIGNS LIST 10 device for determining sound source direction
12 camera
14 array sensor
15 microphones
16 computing means
18 display means
20 input means
22 housing
30 processor
32 storage
40 array sensor
42 array sensor 44 array sensor
46 array sensor

The invention claimed is:

1. A device for determining sound source direction comprising:
- an array sensor including a plurality of microphones configured to measure a sound wave; and
- a processor configured to calculate a sound pressure in each direction based on sound pressure information of the sound wave obtained by the array sensor and determine a direction in which the sound pressure is maximum as a direction of sound wave arrival,
- wherein the plurality of microphones is provided at vertices of two or more concyclic polygons that are on a same plane and that have a same center, and are arranged so as to be non-rotationally symmetric as a whole array sensor, and
- wherein in any rotation less than 360° of the array sensor on the same plane relative to the same center of the concyclic polygons, the plurality of microphones are not simultaneously arranged the same as before the rotation.

2. The device for determining sound source direction according to claim 1, further comprising:
- a camera configured to capture an image of a measurement target,
- wherein the processor is configured to generate a map of sound pressure based on the sound pressure information of the sound wave obtained by the array sensor, and generate a superimposed image by superimposing the map of sound pressure on the captured image obtained by the camera of the measurement target.

3. The device for determining sound source direction according to claim 2, wherein the camera is provided at the center of the concyclic polygons.

4. The device for determining sound source direction according to claim 1, wherein the plurality of microphones is provided at vertices of two concyclic polygons.

5. The device for determining sound source direction according to claim 1, wherein the concyclic polygons are regular polygons.

6. The device for determining sound source direction according to claim 1, wherein a number of vertices of an outermost concyclic polygon among the two or more concyclic polygons are an odd number.

7. The device for determining sound source direction according to claim 1, wherein a number of the plurality of microphones are 9 or more and 24 or less.

8. The device for determining sound source direction according to claim 1, wherein:
- a diameter of a circumscribed circle of an innermost concyclic polygon among the two or more concyclic polygons is 3.0×λ or less, in which λ denotes a wavelength of the sound wave.

9. The device for determining sound source direction according to claim 1, wherein:
- a diameter of a circumscribed circle of an outermost concyclic polygon among the two or more concyclic polygons is 0.5×λ×n or less, in which λ denotes a wavelength of the sound wave, and n denotes a number of the plurality of microphones.

10. The device for determining sound source direction according to claim 1, wherein the processor is configured to shift time of a plurality of items of the sound pressure information obtained by the plurality of microphones by a set amount based on an assumed sound source direction and arrangement of the microphones, calculate an added value by adding the plurality of items of time-shifted sound pressure information, and, when a plurality of added values is obtained while changing the assumed sound source direction, determine the assumed sound source direction at which a largest added value among the plurality of added values is obtained as the direction of sound wave arrival.

* * * * *